(12) United States Patent
Dasgupta et al.

(10) Patent No.: US 7,181,972 B2
(45) Date of Patent: Feb. 27, 2007

(54) STATIC AND DYNAMIC PRESSURE SENSOR

(75) Inventors: Samhita Dasgupta, Niskayuna, NY (US); Jeffrey Bernard Fortin, Niskayuna, NY (US); Steven Francis LeBoeuf, Schenectady, NY (US); Vinayak Tilak, Schenectady, NY (US); Chayan Mitra, Bangalore (IN); Kanakasabapathi Subramanian, Clifton Park, NY (US); Steven Alfred Tysoe, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/023,202

(22) Filed: Dec. 27, 2004

(65) Prior Publication Data
US 2006/0137456 A1 Jun. 29, 2006

(51) Int. Cl.
*G01L 9/00* (2006.01)
(52) U.S. Cl. .......................................... 73/705; 73/754
(58) Field of Classification Search ........... 73/700–756
See application file for complete search history.

(56) References Cited

U.S. PATENT DOCUMENTS

| | | | | |
|---|---|---|---|---|
| 4,781,059 A | * | 11/1988 | Suzuki et al. | 73/117.3 |
| 6,647,796 B2 | | 11/1993 | Beach et al. | 73/754 |
| 5,544,526 A | | 8/1996 | Baltins et al. | 73/180 |
| 5,892,860 A | | 4/1999 | Maron et al. | 385/12 |
| 6,277,295 B1 | * | 8/2001 | Sarkar et al. | 216/34 |
| 6,579,068 B2 | * | 6/2003 | Bridger et al. | 417/53 |
| 6,923,068 B2 | * | 8/2005 | Barron | 73/719 |
| 6,928,878 B1 | * | 8/2005 | Eriksen et al. | 73/724 |
| 6,953,977 B2 | * | 10/2005 | Mlcak et al. | 257/414 |
| 7,091,650 B2 | * | 8/2006 | Xu et al. | 310/330 |
| 2003/0045120 A1 | | 3/2003 | Hu et al. | 438/745 |

FOREIGN PATENT DOCUMENTS

DE 10221219 A1 12/2003
JP 06163939 A * 6/1994

* cited by examiner

*Primary Examiner*—Max Noori
(74) *Attorney, Agent, or Firm*—Fletcher Yoder

(57) ABSTRACT

A sensor, in accordance with aspects of the present technique, is provided. The sensor comprises a membrane formed of gallium nitride. The membrane is disposed on a substrate, which is wet-etched to form a closed cavity. The membrane exhibits both a capacitive response and a piezo-response to an external stimulus. The sensor further includes a circuit for measuring at least one of the capacitive response or the piezo-response. In certain aspects, the sensor may be operable to measure external stimuli, such as, pressure, force and mechanical vibration.

16 Claims, 2 Drawing Sheets

STATIC AND DYNAMIC PRESSURE SENSOR

BACKGROUND

The invention relates generally to pressure sensors, and more particularly to a pressure sensor for measuring static and dynamic pressures at high temperatures.

Pressure sensors are used in a wide range of industrial and consumer applications. Pressures of many different magnitudes may be measured using various types of pressure sensors, such as Bourdon-tube type pressure sensors and diaphragm-based pressure sensors. Several variations of the diaphragm-based pressure sensor have been utilized to measure different ranges of pressure, such as by utilizing cantilever-based pressure sensors, optically read pressure sensors and the like.

Both static and dynamic pressure sensing techniques have been developed for specific pressure sensing applications. Attempts have been made to utilize static pressure sensors at high frequencies in an effort to leverage desirable static sensor properties like high sensitivity, linearity, low response time, high stability, high reliability, longer lifetime and the like. Static pressure sensors, however, typically fail to retain one or more of the aforementioned properties when measuring a pressure that tends to change at a relatively high frequency.

Conversely, dynamic pressure sensors may not be suitable at static pressures because desirable properties such as high sensitivity, linearity, fast response, and reliability may not be achievable by the dynamic pressure sensor at low frequencies. Furthermore, at high temperatures, the elasticity of the diaphragm membrane may be diminished. This may make the diaphragm brittle, thereby reducing the reliable lifetime of the pressure sensor and sensitivity.

Attempts also have been made to combine both types of pressure sensors in a single package. These sensors have separate sensing units for static and dynamic pressure ranges hardwired together in a single package. However, such attempts have not been successful because of slower response and noise interference.

It would therefore be desirable to develop a pressure sensor that can be used in both static and dynamic pressure ranges at high temperatures.

SUMMARY

According to one aspect of the present technique, a sensor is provided. The sensor comprises a membrane formed of gallium nitride. The membrane is disposed onto a substrate, which is wet-etched to form a closed cavity. The membrane exhibits both a capacitive response and a piezo-response to an external stimulus. The sensor further includes a circuit for measuring at least one of the capacitive response or the piezo-response.

In accordance with another aspect of the present technique, a sensor is provided. The sensor comprises a membrane formed of gallium nitride. The membrane is disposed onto a substrate, which is wet-etched to form a closed cavity. The sensor further includes an optical mechanism configured to measure a deflection of the membrane in response to an external stimulus.

These and other features, aspects, and advantages of the present invention will become better understood when the following detailed description is read with reference to the accompanying drawings in which like characters represent like parts throughout the drawings.

DETAILED DESCRIPTION OF EXEMPLARY EMBODIMENTS

In accordance with aspects of the present technique, different sensor embodiments operable to measure an external stimulus such as pressure, force, mechanical vibration, are described in detail herein below. An exemplary sensor embodiment may be a micro-machined pressure sensor that gauges pressure using piezo-responses, such as piezoresistive response or piezoelectric response, or, capacitive sensing techniques. For example a micro-machined pressure sensor may gauge pressure via electronic measurement techniques, according to aspects of the present technique described herein.

Figure 1:
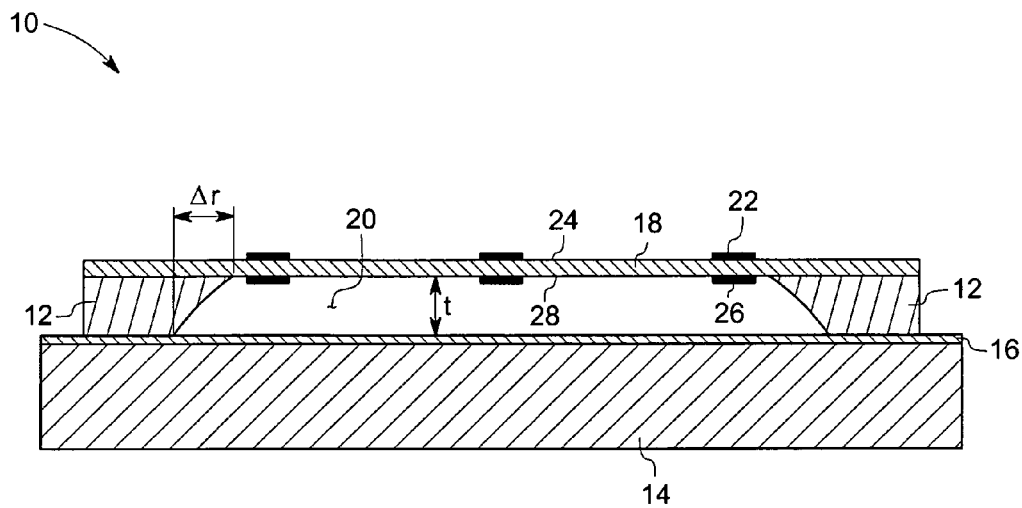
FIG. 1 is a cross-sectional view of a pressure sensor illustrating measurement of pressure using electronic measurement techniques, constructed in accordance with exemplary embodiments of the present technique.

FIG. 1 is a cross-sectional view of an exemplary pressure sensor 10 illustrating measurement of pressure via electronic measurement techniques. The pressure sensor 10 comprises substrate blocks 12 that are mounted on a base substrate 14. In an exemplary embodiment, the substrate blocks 12 are constructed using a first ceramic or crystalline material, such as sapphire ($Al_2O_3$), while the base substrate 14 that is used to mount the substrate block 12 may comprise a second ceramic or crystalline material, such as aluminum nitride (AlN). The substrate blocks 12 may be bonded by wafer bonding techniques to the base substrate 14 via a thin layer of bonding material 16, such as an alloy of titanium and aluminum that is vacuum bonded to the substrate blocks 12 and the base substrate 14. A diaphragm 18 is disposed on the substrate blocks 12, such that a cavity 20 is formed that is defined by substrate 12, base substrate 14, and diaphragm 18. As an example, during the fabrication process of the pressure sensor 10, the GaN epitaxial layer grown over sapphire wafer is placed in a crucible containing a cryolite or potassium fluoroborate ($KBF_4$) mixture. The crucible is heated between about 500 and about 800 degrees Celsius, but preferably no greater than about 600 degrees Celsius, under an atmosphere of ammonia ($NH_3$) to prevent GaN sublimation or dissociation. A patterned mask, such as a metallic multilayer of platinum or the like, is typically placed over the sapphire surface to allow selective wet-etching of diaphragm 18. Simultaneously, the GaN diaphragm 18 is typically protected with a continuous film of the same metallic multilayer to prevent roughening of the GaN surface when exposed to the wet etch. The cavity 20 may be etched out of the block of sapphire over which an epitaxial layer of GaN is grown. The epitaxial layer of GaN above the block of sapphire forms the diaphragm 18 once the cavity 20 is selectively etched out of the sapphire block. In other words, sapphire is chemically reduced leaving behind a GaN diaphragm 18 bound by surrounding sapphire block 14. Alternatively, the entire sapphire may be removed leaving behind freestanding GaN diaphragm 18, which can then be mounted to form the structure as shown in FIG. 1. The thin layer of gallium nitride (GaN) diaphragm 18 thus formed may be of about 15 to about 300 micrometer thickness, in one embodiment. This process yields a selectively wet-etched GaN diaphragm 18 either freestanding or bound by un-etched sapphire regions in sapphire block 12. In addition to potential advantages in manufacturing speed and cost, wet etching does not significantly affect the GaN layer 18. Furthermore, wet etching involves controlled cryolite or $KBF_4$-based etching of sapphire in desired patterns. Wet etching of sapphire, as described herein, is isotropic and provides contoured walls with a rounded slope as illustrated, which can be distinguished by other forms of removal, such as dry etching, laser ablation, and inductively coupled plasma etching. These other forms of removal are anisotropic, and, provide a linear slope (which may be vertical) and non-stoichiometric GaN surface. Moreover, these processes may deteriorate the quality of metal contacts deposited on the GaN layers.

GaN is a wide-band-gap semiconductor with strong piezoelectric polarization coefficients of about 1 $C/m^2$. Even at high temperature, between about 300 degrees Celsius and about 650 degrees Celsius, the piezoelectric coefficient changes very slowly. Therefore, the GaN membrane is highly resistant to high temperatures, harsh chemicals, and radiation.

A plurality of ohmic contacts 22 is deposited on a first surface 24 of the diaphragm 18, while another set of ohmic contacts 26 may be deposited on a second surface 28 of the diaphragm 18. The plurality of ohmic contacts 22 and 26 may be disposed on the diaphragm 18 such that the ohmic contacts 22 and 26 form a Wheatstone bridge design on the surfaces 24 and 28, respectively. The Wheatstone bridge design may facilitate stress measurements in radial and tangential directions.

Figure 2:
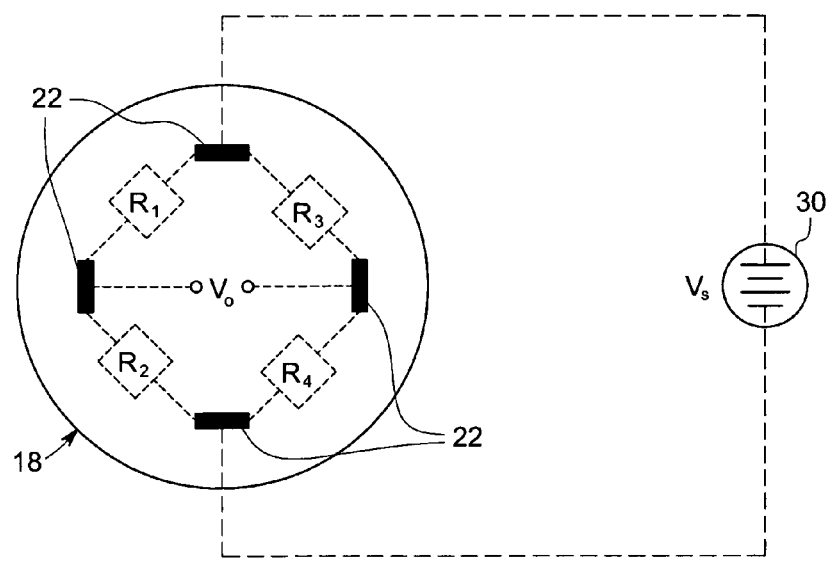
FIG. 2 is a schematic diagram illustrating a pressure sensor constructed in accordance with exemplary embodiments of the present technique.

Referring to FIG. 2, which is a schematic diagram illustrating a pressure sensor constructed in accordance with exemplary embodiments of the present technique, a piezoresistive sensing mechanism will be explained based on the illustration. Each of the four ohmic contacts 22 together may form a Wheatstone bridge design that is powered by a battery 30 or the like to provide a voltage $V_s$. With the four ohmic contacts 22 disposed on the first surface 24 (FIG. 1), when the diaphragm 18 deflects toward the base substrate 14, a compressive stress may be reflected on the first surface 24 of the GaN material (that forms the diaphragm 18). The resulting changes in resistances $R_1$, $R_2$, $R_3$, and $R_4$, may be reflected as a change in output voltage $V_o$ across the arms of the Wheatstone bridge, as will be appreciated by those skilled in the art.

Similarly, with the four ohmic contacts 26 disposed on the second surface 28 (FIG. 1), when the diaphragm 18 deflects toward the base substrate 14, there is a tensile stress developed in the second surface 28 of the GaN diaphragm 18. The resulting changes in resistances $R_1$, $R_2$, $R_3$, and $R_4$, will be reflected as a change in output voltage $V_o$ across the arms of the Wheatstone bridge. Therefore, when pressure in static ranges is to be measured, the piezoresistive property of GaN is utilized for pressure measurement. Unlike the piezoelectric property, which generates voltage in response to dimensional changes, the piezoresistive property generates a change in resistivity in response to dimensional changes.

The pressure sensor 10 with ohmic contacts 22 and 26 may exhibit piezoelectric properties by leveraging lattice mismatch in the GaN atoms of diaphragm 18 generated during fabrication. During fabrication, when the GaN diaphragm 18 is disposed on the top surface of the sapphire block, a lattice mismatch occurs in the GaN atoms. This is because the lattice constant of sapphire is higher compared to GaN material, which results in a rearrangement of atomic positions in the GaN material. Therefore, a lattice mismatch induced strain is developed in the GaN material of diaphragm 18. This induced strain is an inherent characteristic of the diaphragm 18, even when there is no pressure applied externally. The lattice mismatch induced strain in the GaN material generates polarization fields across the first and second surfaces 24, 28 of the diaphragm 18. When an external stimulus such as pressure is applied on the diaphragm 18 of the sensor 10, a greater amount of strain is induced in the GaN diaphragm 18, which generates stronger polarization fields.

The ohmic contacts 22 and 26 that are disposed on the first and second surfaces 24 and 28, respectively, exhibit a change in output voltage $V_o$ across the arms of the Wheatstone bridge. When the diaphragm 18 deflects toward the base substrate 14, there is a compressive stress developed in the GaN diaphragm 18, which causes a change in polarization fields, hence impedance, in the GaN material between the ohmic contacts 22 on the first surface 24 of the diaphragm 18. Similarly, there is a tensile stress developed in the GaN diaphragm 18, which is reflected as a change in polarization fields, hence impedance, in the GaN material between the ohmic contacts 26 on the second surface 28 of the diaphragm 18, when the diaphragm 18 deflects downwards. This change in polarization field between the surfaces 24 and 28 results in a measurable voltage response between the contacts 22 and 26. This polarization field may be substantially high, of about 1 MV/cm. However, the field may be eventually compensated by charge within the semiconductor or from surrounding regions. Nonetheless, though this voltage response decays with time, the response can be very high with respect to noise. Therefore, while measuring pressure in dynamic environments, the piezoelectric property of GaN will generate a high signal-to-noise voltage response, and this property may be utilized for dynamic pressure measurements.

If the ohmic contacts 22 on the first surface 24 of the diaphragm 18 are extended to cover the entire length of the diaphragm 18, the disc thereby formed by the ohmic contacts 22 will behave as one plate of a capacitive pair while the thin layer of bonding material 16 will form the other plate of the capacitive pair. The deformation of diaphragm 18 of pressure sensor 10 due to pressure may thus cause a change in distance between the plates 16 and 22, thereby causing a corresponding change in the capacitance of the capacitive pair that is formed by the plates 16 and 22. Similarly, if the ohmic contacts 26 on the second surface 28 of the diaphragm 18 are extended to cover the entire length of the diaphragm 18, the disc formed by the ohmic contacts 26 will behave as one plate of a capacitive pair while the thin layer of bonding material 16 will form the other plate of the capacitive pair. In both cases, the change in capacitance may be compared against a reference capacitance, and the change in capacitance with respect to the reference capacitance may be calibrated to read the pressure that is applied on the pressure sensor 10.

Another embodiment of a sensor operable to measure external stimulus such as pressure, force, mechanical vibration, in accordance with aspects of the present techniques, is a micro-machined optically addressed pressure sensor that gauges pressure using optical sensing techniques.

Figure 3:
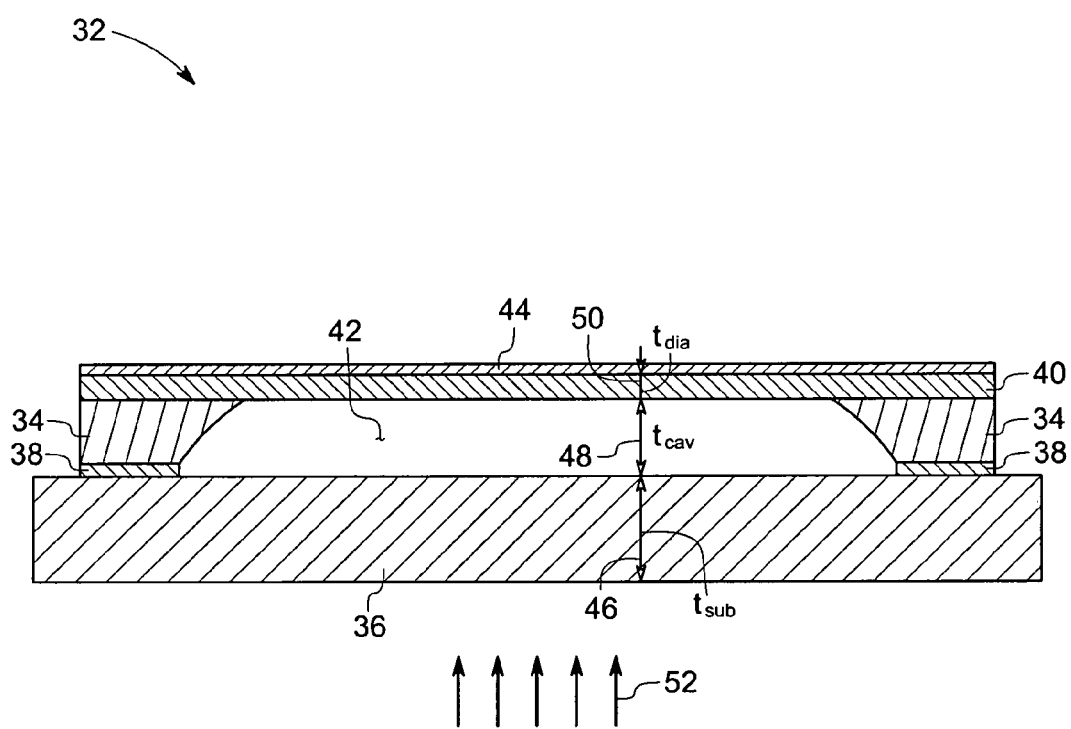
FIG. 3 is a cross-sectional view of a pressure sensor illustrating measurement of pressure using optical techniques, constructed in accordance with exemplary embodiments of the present technique.

FIG. 3 is a cross-sectional view of an exemplary pressure sensor 32 illustrating measurement of pressure via optical measurement techniques. The pressure sensor 32 comprises at least one substrate block 34 mounted on a base substrate 36. In one embodiment, the substrate blocks 34 are constructed using a first ceramic material, such as sapphire, and the base substrate 36 that is used to mount the substrate blocks 34 is made of a second ceramic material, such as quartz (SiO$_2$) or sapphire. The substrate blocks 34 may be bonded by vacuum wafer bonding techniques to the base substrate 36 via a thin layer of bonding material 38, such as an alloy of titanium and aluminum. A diaphragm 40 is disposed on the substrate blocks 34, such that a cavity 42 is formed that is defined by substrate 34, base substrate 36, and diaphragm 40. The pressure sensor 32 may be fabricated as described with respect to FIG. 1.

A thin layer of optically reflective material 44 is disposed on a top surface of the diaphragm 40, as illustrated. The optically reflective material 44 may comprise a metallic reflector. Moreover, the optically reflective material 44 may also be disposed in the opposite side of layer 40, such that it forms one surface defining the cavity 42. The optical transmittance window for quartz may be defined by about 150 nanometer to about 5 micrometer, while the optical transmittance window for sapphire may be defined by about 190 nanometer to about 2.9 micrometer. Depending on the design requirements, a choice of quartz or sapphire or the like may be made for the base substrate 36. Therefore, electromagnetic radiations above about 300 nanometer will be reflected from the optically reflective material 44. However, other wavelengths of light below about 300 nanometer may be absorbed by either GaN diaphragm 40 or base substrate 36.

The optical measurement of pressure via the optically read pressure sensor 32 will be explained with respect to FIG. 3, in which, $\mu_{sub}$ is the refractive index of the base substrate 36;

$t_{sub}$ is the thickness of base substrate 36 and is denoted by reference numeral 46;

$\mu_{cav}$ is the refractive index of cavity 42, and since the cavity may be vacuum sealed, $\mu_{cav} = \mu_{vac}$, where $\mu_{vac}$ is the refractive index of vacuum;

$t_{cav}$ is the thickness of cavity 42 and is denoted by reference numeral 48;

$\mu_{dia}$ is the refractive index of GaN diaphragm 40; and $t_{dia}$ is the thickness of GaN diaphragm 40 and is denoted by reference numeral 50.

A light beam 52 that is made incident on the optically read pressure sensor 32 travels an optical path length ($\Lambda$) from the base substrate 36 to the optically reflective material 44, and may be represented by the following equation:

$$\Lambda = \mu_{sub} \cdot t_{sub} + \mu_{cav} \cdot t_{cav} + \mu_{dia} \cdot t_{dia}$$

Therefore, after reflection from the optically reflective material 44 the light beam 52 will travel double the optical path length, i.e., 2$\Lambda$. The reflected beam of light may form an interferometric pattern on an optical device or an optical power meter, such as a spectrometer. Two types of interferometric patterns that may be formed are: bright fringes when the reflected light beams constructively interfere, and dark fringes when the reflected light beams destructively interfere. The interferometric patterns may depend on the wavelength of light that is made incident, as represented by the following equation:

at constructive interference: $2\Lambda = m \cdot \lambda$ at destructive interference: $2\Lambda = \left(m - \frac{1}{2}\right) \cdot \lambda$ where, m=1, 2, 3, . . .

Therefore, when total optical path length 2$\Lambda$ is an integral multiple of wavelength ($\lambda$), bright fringes are formed and when the total optical path length 2$\Lambda$ is a half-integral multiple of wavelength ($\lambda$), dark fringes are formed. However, when the total optical path length 2$\Lambda$ is a fractional multiple of wavelength ($\lambda$) other than integral or half-integral multiples of wavelength ($\lambda$), the optical power of the fringe lies between the optical powers of a bright fringe and a dark fringe, i.e. a fringe of a different intensity is formed.

When the optically read pressure sensor 32 is subjected to pressure that is to be measured, the thickness of the cavity ($t_{cav}$) changes depending upon the pressure, because the applied pressure will cause a mechanical deflection in the diaphragm 40. The change in thickness of the cavity ($t_{cav}$) results in a change in the total optical path length 2$\Lambda$ as follows:

$$2\Lambda = 2 \cdot (\mu_{sub} \cdot t_{sub} + \mu_{cav} \cdot t_{cav} + \mu_{dia} \cdot t_{dia})$$

With a gradual change in pressure, there is a gradual change in the total optical path length 2$\Lambda$ from $m \cdot \lambda$ to $$\left(m - \frac{1}{2}\right) \cdot \lambda,$$

since wavelength ($\lambda$) is constant. In other words, the total optical path length 2$\Lambda$ gradually shifts from an integral multiple of wavelength ($\lambda$) to a half-integral multiple of wavelength ($\lambda$), or vice-versa. Therefore, the optical power or intensity of the fringe varies between that of a bright fringe and a dark fringe. In other words, the fringe thus formed, will not be as bright as a bright fringe, or be as dark as a dark fringe. It should be appreciated that the change in optical power of the fringe may be measured and calibrated to read the pressure that is applied on the optically read pressure sensor 32. Furthermore, it will be appreciated that even with rapid changes in pressure, i.e., rapid changes in diaphragm fluctuations, the optical measurement may be conducted as efficiently as with gradual changes in pressure. Thus, the optically read pressure sensor 32 may be utilized both as a static pressure sensor and a dynamic pressure sensor.

In the embodiments noted above with respect to FIG. 1 and FIG. 3, the substrate blocks 12 and 34 may be micro-machined on an integrated chip using ceramic or crystalline materials such as, but not limited to, quartz (SiO$_2$), sapphire (Al$_2$O$_3$), and silicon carbide (SiC). The base substrates 14 and 36 may be constructed using ceramic or crystalline materials such as, but not limited to, quartz (SiO$_2$), sapphire (Al$_2$O$_3$), silicon carbide (SiC), and aluminum nitride (AlN). The plurality of ohmic contacts 22 and 26 that may be used can be metallic contacts that are constructed using aluminum (Al). However, other types of contacts may be used, such as but not limited to a tiered structure made of titanium-aluminum-titanium-gold (Ti—Al—Ti—Au), with titanium bonded on the top surface of the GaN diaphragm 18 and the gold as the topmost layer. Similarly, other combinations that may be used are: titanium-aluminum-nickel-gold (Ti—Al—Ni—Au), titanium-aluminum-molybdenum-gold (Ti—Al—Mo—Au), and titanium-aluminum-platinum-gold (Ti—Al—Pt—Au). Furthermore, the embodiments noted above with respect to FIG. 1 and FIG. 3 may be operable to measure pressure up to about 400 psia at temperatures in excess of 300 degree Celsius up to 760 degree Celsius. As was previously described, both embodiments are operable to measure external stimulus, such as pressure in static and dynamic ranges, for example, up to about 25 kHz. In addition, the fast responses due to piezoelectric, piezoresistive, capacitive, and optical measurement techniques may be advantageously utilized to provide lower response delays even at such higher temperatures. The embodiments may be micro-machined onto an integrated chip or on a substrate directly, and because the sensors are structurally miniaturized, the pressure sensors discussed hereinabove may be employed in high noise industrial environments or harsh environments, such as locomotive propulsion systems like diesel engines, ground based power generators like oil-drilling generators. Other advantages of the pressure sensors constructed in accordance with the presently disclosed techniques may include: improved fabrication precision; small structures with high sensitivity; optical interrogation without electrical connections, which may reduce or eliminate electromagnetic interference; and reduced manufacturing cost.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sensor, comprising:
    a membrane formed of gallium nitride;
    a sapphire substrate that has been wet-etched to form a cavity, wherein the membrane is disposed on said sapphire substrate and exhibits both a capacitive response and a piezo-response to an external stimulus, wherein the membrane is coupled to and bound by the substrate; and
    a circuit for measuring at least one of the capacitive response or the piezo-response.

2. The sensor as recited in claim 1, wherein the membrane comprises at least one diaphragm.

3. The sensor as recited in claim 1, wherein the sensor is operable at temperature in excess of about 200 degree Celsius.

4. The sensor as recited in claim 1, further comprising a substrate formed of silicon carbide.

5. The sensor as recited in claim 1, wherein the membrane provides a response to pressure.

6. The sensor as recited in claim 1, wherein the membrane provides a response to force.

7. The sensor as recited in claim 1, wherein the membrane provides a response to mechanical vibration.

8. A sensor, comprising:
    a membrane formed of gallium nitride;
    a sapphire substrate that has been wet-etched to form a cavity, wherein said membrane is disposed on said sapphire substrate, wherein said membrane is coupled to and bound by said substrate; and
    an optical mechanism configured to measure a deflection of the membrane in response to an external stimulus.

9. The sensor of claim 8, wherein the membrane comprises at least one diaphragm.

10. The sensor as recited in claim 8, wherein the sensor is operable at temperature in excess of about 200 degree Celsius.

11. The sensor as recited in claim 8, further comprising a substrate formed of silicon carbide.

12. The sensor as recited in claim 8, wherein the external stimulus comprises pressure.

13. The sensor as recited in claim 8, wherein the external stimulus comprises force.

14. The sensor as recited in claim 8, wherein the external stimulus comprises mechanical vibration.

15. A pressure sensor comprising a gallium nitride membrane, wherein the pressure sensor is formed by:
    etching a sapphire substrate disposed with the gallium nitride membrane to form a cavity, the gallium nitride membrane being coupled to and bound by the sapphire substrate and being operable to respond to at least one of a piezo-response, a capacitive response, an optical interrogation, or an external stimulus; and
    coupling a circuit that measures at least one of the piezo-response, the capacitive response, or the optical interrogation.

16. The pressure sensor of claim 15, wherein etching the substrate disposed with the gallium nitride membrane comprises wet-etching the substrate via cryolite.

* * * * *